Oct. 18, 1966  O. C. BRITSCHGI  3,279,700
SAFETY CAR HOLDER AND MAT TO PREVENT WHEEL TURNING
Filed June 19, 1964

INVENTOR.
OTTO C. BRITSCHGI

BY
*Fulwider, Patton, Rieber,
Lee and Utecht*
ATTORNEYS

United States Patent Office 3,279,700
Patented Oct. 18, 1966

3,279,700
SAFETY CAR HOLDER AND MAT TO PREVENT
WHEEL TURNING
Otto C. Britschgi, P.O. Box 23, Holtville, Calif.
Filed June 19, 1964, Ser. No. 376,518
2 Claims. (Cl. 238—14)

The present invention relates to a combination traction track and stop for a wheel.

The traction track and stop for the present invention includes three main frames. Each frame includes a pair of runners and bars; these bars connect the runners of a frame with one another and connect the frames to one another so that all frames can be extended linearly of one another to form a traction track.

The ends of the runners of one of the frames, forming one end of the track, are in the form of stakes; the ends of the runners of another of the frames, forming the opposite end of the track, are provided with hooks which are capable of being hooked about a bar of the aforementioned frame having the stake-type runners; and the distance between the bar, which connects the intermediate frame with the runners having the hooks, and the hooks, is greater than the distance between the connecting bars of the intermediate frame, whereby when the hooks are connected with the bar of the frame using the stake-type runners, the bar which connects the intermediate frame with the frame having the stake-type runners, will lie in a higher horizontal plane than the other bars and will function as a stop for a wheel.

Other features and the advantages of the present invention will be apparent from the following description, reference being had to the accompanying drawing wherein a preferred embodiment of the invention is illustrated.

Figure 1:
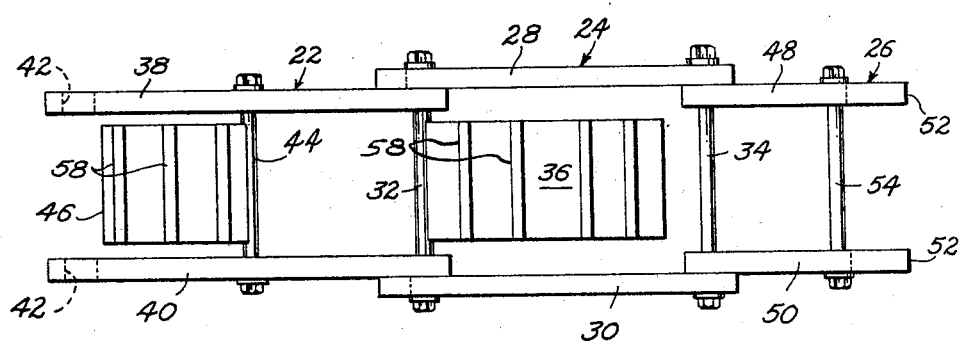
FIG. 1 is a top plan view of the traction track and stop.

Referring more in detail to the drawing, the combination traction track and stop for a wheel 20 comprises three main frames, herein referred to as the left frame 22, the intermediate frame 24, and the right frame 26.

The intermediate frame 24 includes two runners 28 and 30 which are arranged parallelly, or substantially so, and are connected by bars 32 and 34 in the form of bolts. Bolt 32 connects the left ends of the runners with one another, and bolt 34 connects the right ends of the runners with one another. The bolt 32 carries a ramp 36.

The left frame 22 includes two parallelly, or substantially parallelly arranged runners 38 and 40. As viewed in FIG. 1, these runners are pivotally mounted on the bolt 32. The left ends of the runners 38 and 40 are in the form of hooks 42. A bar 44 connects the runners 38 and 40 intermediate the ends thereof, and the bar 44 carries a ramp 46.

The right frame 26 includes two parallelly, or substantially parallelly arranged runners 48 and 50. As viewed in FIG. 1, these runners are pivotally mounted upon the bars 34. The right ends 52 of the runners 50 are in the form of pointed stakes. A bar 54 interconnects the runners 48 and 50 intermediate the ends of the runners.

Figure 2:
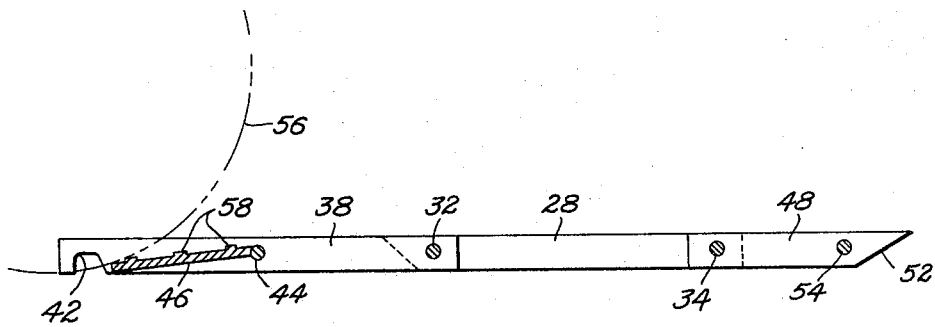
FIG. 2 is a cross sectional view taken through the center of FIG. 1, but omitting one of the ramps.

The device as shown in FIGS. 1 and 2, can be used as a traction track in the event that an automobile wheel becomes mired in sand or mud. In that event the left end of the device is inserted in front of the rear wheel of the automobile as far as possible. Part of such a wheel is shown at 56 in phantom in FIG. 2. As the wheel turns, the track will be fed rearwardly under the wheel. In some cases, it is advisable to feed the track rearwardly as the wheel is turned slowly.

Figure 3:
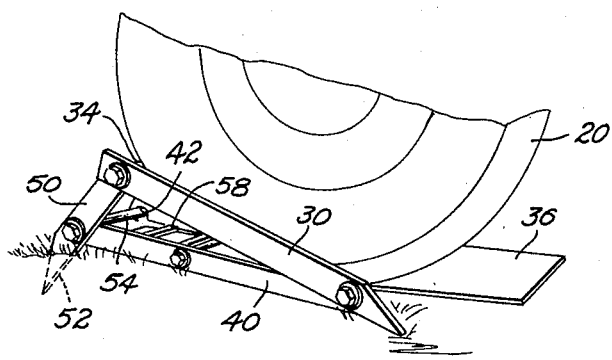
FIG. 3 is a perspective view showing the frames in wheel stopping position, and showing a fragment of a wheel.

When it is desirable to use the device as a wheel stop, the frames are moved to the position shown in FIG. 3, wherein the frames 24 and 26 are turned counterclockwise. The stake ends 52 of the runners 48 and 50 are pushed onto the soil, and then the hooks 42 of the runners 38 and 40 are latched with the bar 54 of the frame 26. The distance between the bar 32 and the hooks 42 of the frame 22, is greater than the distance between the bars 32 and 34, whereby when the device is in the position shown in FIG. 3, the bar 34 is on a higher horizontal plane, and forms a stop for the wheel when it is disposed between the runners 38 and 40 of the frame 22.

Preferably, all of the parts are formed of a heavy grade of steel so as to withstand the pressure applied thereon. Preferably, the ramp 46 is, or both ramps are provided with cleats 58 to improve the traction of the ramps when the device is used as a traction track.

From the foregoing it is readily apparent that there has been provided a simple, durable and inexpensive device which can function either as a traction track for a mired automobile, or as a stop to prevent rolling of an automobile in the event that it is jacked for, for example, tire removal.

While the form of embodiment herein shown and described, constitutes preferred form, it is to be understood that other forms may be adopted falling within the scope of the claims that follow.

I claim:

1. A combination traction track and stop for a wheel, comprising in combination:
    (A) A frame (24) including:
        (1) a pair of substantially parallelly extending runners (28 and 30);
        (2) a transverse bar (34) pivotally connecting one end of one runner to the end of the other runner;
        (3) a second transverse bar (32) pivotally connecting the other ends of the runners;
    (B) a second frame (26) including:
        (1) a pair of substantially parallelly extending runners (48 and 50) having one end of each pivotally connected with the first mentioned bar (34), the opposite ends of the last mentioned runner forming stakes (52);
        (2) a bar (54) interposed between the ends of, and connecting said last mentioned runners;
    (C) a third frame (22) including:
        (1) a pair of substantially parallelly extending runners (38 and 40) having one end of each pivotally connected with the second mentioned bar (32) of the first mentioned frame (24), the opposite ends of the runner of the third mentioned frame forming hooks (42) engagable with the bar (54) of the second mentioned frame (26), the combined distance from the second mentioned bar (32) of the first mentioned frame (24) to the hooks (42) on the runners (38 and 40) of the third mentioned frame (22) and the distance from the first mentioned bar (34) of the first mentioned frame (24) to the bar (54) included in the second mentioned frame being greater than the distance between the bars (32 and 34) of the first mentioned frame.

2. A combination traction track and stop for a wheel as defined in claim 1, characterized to include:
 (A) (4) a ramp (36) attached to the first mentioned bar (32) of the first mentioned frame (24).

References Cited by the Examiner

UNITED STATES PATENTS

| | | | |
|---|---|---|---|
| 1,574,729 | 2/1926 | Foster | 238—14 |
| 2,248,537 | 7/1941 | Libbey | 238—14 |
| 3,219,152 | 11/1965 | Castellani et al. | 188—4 |

ARTHUR L. LA POINT, *Primary Examiner.*

R. A. BERTSCH, *Assistant Examiner.*